United States Patent
Bertero et al.

(10) Patent No.: US 8,991,438 B2
(45) Date of Patent: Mar. 31, 2015

(54) FLUID TRANSFER PIPE WITH CORRUGATED PORTION(S) AND METHOD FOR MANUFACTURING SAME

(75) Inventors: Luciano Bertero, Rivalta di Torino (IT); Mario Robasto, Giaveno (IT); Romain Jeanson, Collegno (IT); Claudio Ramaro, Nichelino (IT)

(73) Assignee: Hutchinson SRL, Rivoli-Torino (IT)

( * ) Notice: Subject to any disclaimer, the term of this patent is extended or adjusted under 35 U.S.C. 154(b) by 248 days.

(21) Appl. No.: 13/230,307

(22) Filed: Sep. 12, 2011

(65) Prior Publication Data
US 2012/0085454 A1 Apr. 12, 2012

(30) Foreign Application Priority Data

Sep. 14, 2010 (IT) .............................. MI2010A1671

(51) Int. Cl.
| | |
|---|---|
| *F16L 11/00* | (2006.01) |
| *F16L 11/11* | (2006.01) |
| *B29C 47/00* | (2006.01) |
| *B29C 49/00* | (2006.01) |
| *F16L 11/15* | (2006.01) |

(Continued)

(52) U.S. Cl.
CPC ........... *F16L 11/111* (2013.01); *B29C 47/0021* (2013.01); *B29C 49/0021* (2013.01); *F16L 11/15* (2013.01); *B29C 47/126* (2013.01); *B29K 2021/003* (2013.01); *B29K 2023/06* (2013.01); *B29K 2027/18* (2013.01); *B29K 2067/003* (2013.01); *B29K 2067/006* (2013.01); *B29K 2075/00* (2013.01); *B29K 2077/00* (2013.01); *B29L 2023/183* (2013.01); *B29L 2023/22* (2013.01)

USPC ............................ 138/121; 138/122; 138/173

(58) Field of Classification Search
CPC .................................. F16L 11/15; F16L 27/11
USPC .......................................... 138/121, 122, 173
See application file for complete search history.

(56) References Cited

U.S. PATENT DOCUMENTS

| | | | | |
|---|---|---|---|---|
| 530,305 | A | * | 12/1894 | Hall .............................. 138/173 |
| 3,578,777 | A | * | 5/1971 | DeGain ........................ 138/121 |

(Continued)

FOREIGN PATENT DOCUMENTS

EP 0 882 925 A2 12/1998

OTHER PUBLICATIONS

The Search Report for Italian Application No. MI2010A001671, filed Sep. 14, 2010.

*Primary Examiner* — Kevin P Shaver
*Assistant Examiner* — Nicholas J Weiss
(74) *Attorney, Agent, or Firm* — Alston & Bird LLP

(57) ABSTRACT

The invention provides a fluid transfer pipe for filling a cooling circuit of a motor vehicle, and the method for manufacturing said pipe. This pipe includes at least one corrugated bendable portion based on at least one thermoplastic material and which includes a succession of radial reliefs axially spaced so as to form hollows between them, each relief having two frontal regions linked together by an intermediate region, the frontal regions of each relief each having one and the same overall polygonal contour defining at least three straight sections forming flats for this relief and interlinked by rounded sections forming bulges, and the contours of the successive reliefs being adapted to allow for the stripping of the corrugated portion from two hemicylindrical shells of a mold along a single axial stripping plane.

9 Claims, 3 Drawing Sheets

(51) Int. Cl.
   *B29C 47/12*  (2006.01)
   *B29K 21/00*  (2006.01)
   *B29K 27/18*  (2006.01)
   *B29K 67/00*  (2006.01)
   *B29K 75/00*  (2006.01)
   *B29K 77/00*  (2006.01)
   *B29L 23/18*  (2006.01)
   *B29L 23/00*  (2006.01)

(56) References Cited

U.S. PATENT DOCUMENTS

| | | | |
|---|---|---|---|
| 3,693,664 A | | 9/1972 | Schmunk |
| 3,751,541 A | | 8/1973 | Hegler |
| 3,855,799 A | * | 12/1974 | Martin et al. ............. 405/49 |
| 3,864,446 A | * | 2/1975 | Maroschak ............. 264/508 |
| 4,357,190 A | | 11/1982 | Fouss et al. |
| 5,305,799 A | * | 4/1994 | Dal Palu ............. 138/109 |
| 5,447,128 A | * | 9/1995 | Spinelli ............. 123/184.21 |
| 5,792,532 A | * | 8/1998 | Pfleger ............. 428/36.9 |
| 6,021,816 A | | 2/2000 | Jeltsch et al. |
| 6,056,018 A | * | 5/2000 | Renaud ............. 138/121 |
| 6,338,507 B1 | | 1/2002 | Amatsutsu |
| D566,064 S | * | 4/2008 | Kanao ............. D13/199 |
| 2004/0226623 A1 | * | 11/2004 | Chenoweth et al. ............. 138/121 |
| 2005/0103392 A1 | * | 5/2005 | Cheng et al. ............. 138/121 |
| 2007/0256751 A1 | * | 11/2007 | Kellner et al. ............. 138/121 |

* cited by examiner

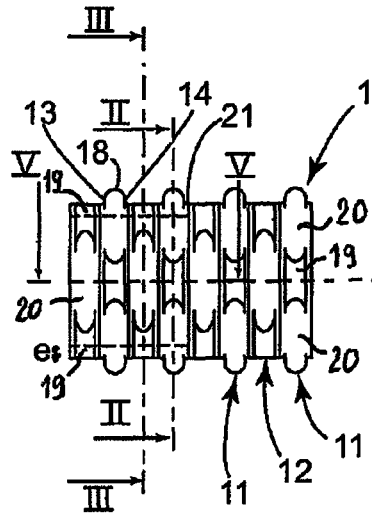
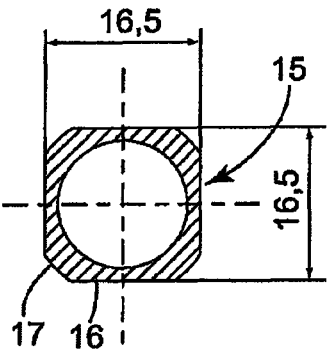
FIG.1  FIG.2  FIG.3
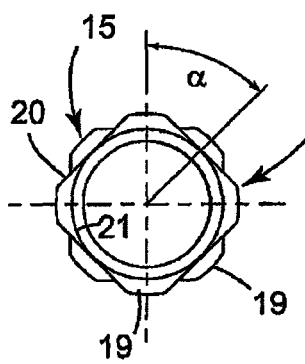
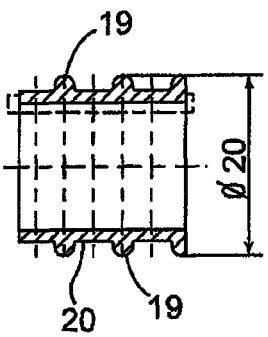
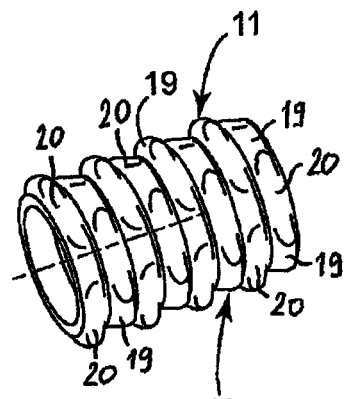
FIG.4  FIG.5  FIG.6
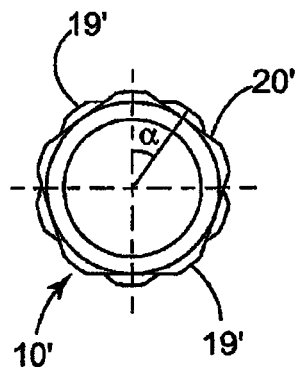
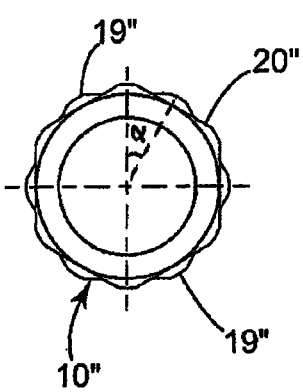
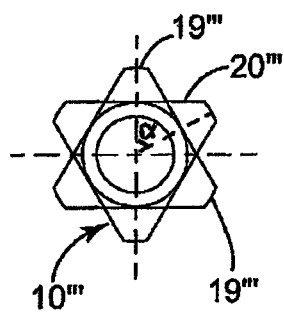
FIG.7  FIG.8  FIG.9

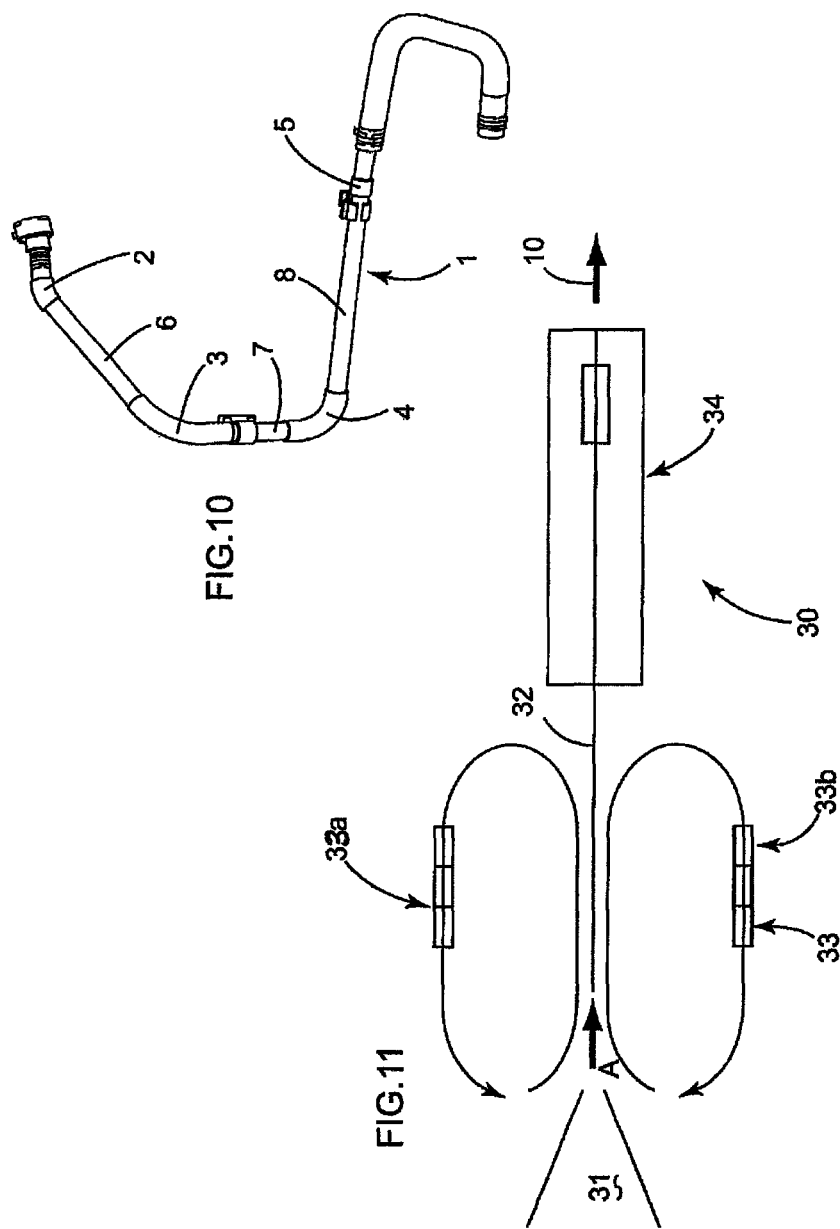

FLUID TRANSFER PIPE WITH CORRUGATED PORTION(S) AND METHOD FOR MANUFACTURING SAME

FIELD OF THE INVENTION

The present invention relates to a fluid transfer pipe in particular for filling a motor vehicle cooling circuit, this pipe comprising at least one corrugated bendable portion, and a method for manufacturing this pipe. The invention applies generally to bendable pipes made of at least one thermoplastic material and being able to transfer all liquid fluids (e.g. water or a coolant for heat engine) or gaseous fluids (e.g. air).

BACKGROUND

As is known, the motor vehicle manufacturers demand that the cooling circuit filling pipes should withstand displacements in all three directions as well as vibrations, which is obtained by the presence of undulations or corrugations defining reliefs and hollows on the outer face of these pipes, which are conventionally made of rubber for reasons of flexibility in response to the displacements, and of resistance to the fluid conveyed and to its temperature and circulation pressure.

Recently, and in particular for economic reasons, research has been conducted into producing such corrugated pipes using thermoplastic materials for its regions that are fixed in relation to the displacements, while retaining rubber for the regions subject to these displacements, or even entirely of one or more thermoplastic materials in order to further reduce their cost of manufacture.

The document U.S. Pat. No. 6,021,816 can, for example, be cited for the description of such a corrugated pipe which is entirely thermoplastic, whose ring-shaped reliefs have overall rounded contours of elliptical, oval or circular type, with angular offsets between these reliefs.

A major drawback in the known corrugated thermoplastic pipes lies in these rounded geometries for the contours of these annular reliefs which, if they favour the flexibility of the pipe for its displacements, have the undesirable effect of resulting in a flattening and therefore an elongation of these reliefs in the axial direction of the pipe, because of the high operating temperatures and/or pressures.

SUMMARY OF THE INVENTION

One aim of the present invention is to propose a fluid transfer pipe in particular for filling a cooling circuit of a motor vehicle heat engine which makes it possible to remedy these drawbacks, this pipe comprising at least one single-layer or multilayer corrugated bendable portion which is based on at least one thermoplastic material and which comprises a succession of radial reliefs which are axially spaced so as to form hollows between them, each relief having two frontal regions linked together by an intermediate region, the frontal regions of each relief each having one and the same overall polygonal contour defining at least three straight sections interlinked by rounded sections, and the contours of these successive reliefs being adapted to allow for the stripping of said at least one corrugated portion from two hemicylindrical shells of a mould along a single axial stripping plane.

To this end, a pipe according to the invention is such that, at the level of said rounded sections of each relief, said two frontal regions meet in said intermediate region by forming, for each relief, n (n being an integer equal to or greater than 3) discontinuous convex bulges which are substantially in the form of a circular arc in the circumferential and axial directions.

The expression "overall polygonal" contour should be understood in the present description to mean a contour in which the straight sections have a length greater than that of the rounded sections.

It will be noted that these straight sections associated for each relief with these rounded sections formed by these discontinuous convex bulges (this convexity of the bulges being not only circumferential but also axial) make it possible to provide a satisfactory trade-off between, on the one hand, the flexibility of the pipe in its bent portion or portions subject to displacements by virtue of the presence of these rounded sections and, on the other hand, an effective resistance to elongation of the reliefs in the axial direction of the pipe by virtue of these straight sections, unlike the overall rounded reliefs of the prior art which are the seat of axial elongations.

According to another characteristic of the invention relating to said or each corrugated portion, the respective contours of said reliefs are identical and angularly offset from one relief to another.

It will be noted that the abovementioned essential condition for each contour, which is to allow for the stripping of the pipe along a single stripping plane between the two identical shells of the mould, implies that the respective contours of the reliefs are axisymmetrical.

According to another characteristic of the invention, the contour of each relief substantially may define a convex regular polygon with n sides (n being an integer equal to or greater than 3) and with n truncated summits formed by said rounded sections, and the reliefs follow one another in alternation according to one and the same angular offset of $\pi/n$ radians by defining two angular positions for the polygons of all of these reliefs.

It will thus be noted that an angular offset between two consecutive reliefs corresponding to an angle different to $\pi/n$ radians—for example $\pi/8$ radians for a truncated regular polygon other than an octagon—cannot be used to produce the or each corrugated portion of a pipe according to the invention by moulding by means of an extrusion blow-moulding of at least one plastomer and/or thermoplastic elastomer from an extruding machine to a mould with two mobile hemicylindrical shells, these shells defining an axial stripping plane for the pipe.

Preferably, this contour in the form of a truncated regular polygon is chosen such that n is inclusively between 3 and 8, i.e. a contour in the form of an equilateral triangle, a square, a pentagon, a hexagon, a heptagon or an octagon, all of them regular.

As indicated previously, these truncated summits ensure the flexibility of the or each corrugated portion, whereas the sides of each duly truncated polygon make it possible to minimize the axial elongation of the reliefs after a given duration of use.

Preferably, the contours of said reliefs each have an even number n of sides, being, for example, truncated squares offset in alternation according to an angle of $\pi/4$ radians or else truncated regular hexagons offset according to an angle of $\pi/6$ radians.

It will be noted that these polygons with an even number of sides advantageously facilitate the bending of the pipe.

According to another characteristic of the invention, at the level of said straight sections, the frontal regions of each relief are coplanar and form flats defining n discontinuous bottoms of each hollow separating two said consecutive bulges from one another in the circumferential direction (whereas, as indicated above, the two frontal regions of each relief are both convex in the axial direction at the level of said rounded sections to form these bulges).

According to another characteristic of the invention, said reliefs may be separated two-by-two from one another by an interstitial peripheral smooth portion of said at least one corrugated portion, these reliefs not having any axial bridges linking them together two-by-two.

It will be noted that the n bulges formed in this way on each relief are formed discontinuously, in other words that the or each corrugated portion does not comprise any ringlet-shaped circumferentially continuous bulge, unlike in the prior art.

Advantageously, a pipe according to the invention can be moulded by extrusion blow-moulding of at least one plastomer and/or thermoplastic elastomer in a mould with two shells defining an axial stripping plane for the pipe.

According to an exemplary embodiment of the invention, said at least one corrugated portion comprises an internal layer for example made of a thermoplastic elastomer and an external layer for example made of a plastomer, all the layers having said reliefs and said hollows in this corrugated portion.

According to a variant of the invention, said at least one corrugated portion may include a smooth internal tubular portion and a corrugated external tubular portion which defines said reliefs and said hollows and which covers said internal portion by being attached thereto (for example, by a fusion-type assembly).

The manufacturing method according to the invention for a pipe as defined hereinabove comprises a moulding by extrusion blow-moulding of at least one plastomer and/or thermoplastic elastomer from an extruding machine to a mould with two mobile hemicylindrical shells, these shells defining an axial stripping plane for the pipe.

Examples of plastomers that may for example be used are polyamides (e.g. PA6, PA11 or PA12), polyesters (e.g. PET or PBT), polyolefins (e.g. polyethylenes), polyurethanes or polytetrafluoroethylenes (PTFE), as non-limiting examples.

Examples of thermoplastic elastomers (TPE) that may for example be used are olefinic thermoplastic elastomers (TPO), thermoplastic vulcanizates (TPV) or thermoplastic polyurethanes (TPU), to give a few non-limiting examples.

According to one embodiment of the invention common to all of the abovementioned characteristics for the pipe, said reliefs are each centred on a transversal plane perpendicular to the longitudinal axis of symmetry of the pipe (i.e. each relief forms an angle of $\pi/2$ radians with this axis).

As a variant, these reliefs according to the invention may each be centred on a plane forming with the longitudinal axis of symmetry of the pipe an angle of between $\pi/6$ and $\pi/2$ radians, so that the profile chosen for these reliefs makes it possible, as indicated hereinabove, to produce the pipe by this extrusion blow-moulding from an extruding machine to a mould with two mobile hemicylindrical shells defining an axial stripping plane for the pipe.

BRIEF DESCRIPTION OF THE DRAWINGS

Other features, advantages and details of the present invention will emerge from reading the following description of a number of exemplary embodiments of the invention, given as non-limiting illustrations, said description being provided with reference to the appended drawings, in which:

FIG. 1 is a lateral schematic view in elevation of a corrugated portion of a pipe according to an example of the invention, FIG. 2 is a transversal cross-sectional view of this corrugated portion along the plane II-II of FIG. 1, FIG. 3 is a transversal cross-sectional view of this corrugated portion along the plane III-III of FIG. 1, FIG. 4 is a frontal schematic view from the right of this corrugated portion of FIG. 1, FIG. 5 is an axial cross-sectional view of this corrugated portion along the plane V-V of FIG. 1, FIG. 6 is a lateral schematic view in perspective of this same corrugated portion of FIG. 1, FIG. 7 is a frontal schematic view of a corrugated portion according to the invention according to a variant of FIG. 4, FIG. 8 is a frontal schematic view of a corrugated portion according to the invention according to another variant of FIG. 4, and FIG. 9 is a frontal schematic view of a corrugated portion according to the invention according to yet another variant of FIG. 4, FIG. 10 is a lateral perspective view of a pipe according to the invention for filling a heat engine cooling circuit, comprising a number of corrugated portions such as those of FIGS. 1 to 9, FIG. 11 is a diagram showing the operation of an installation for manufacturing a pipe according to the invention such as that of FIG. 10.

DETAILED DESCRIPTION

Figure 12:
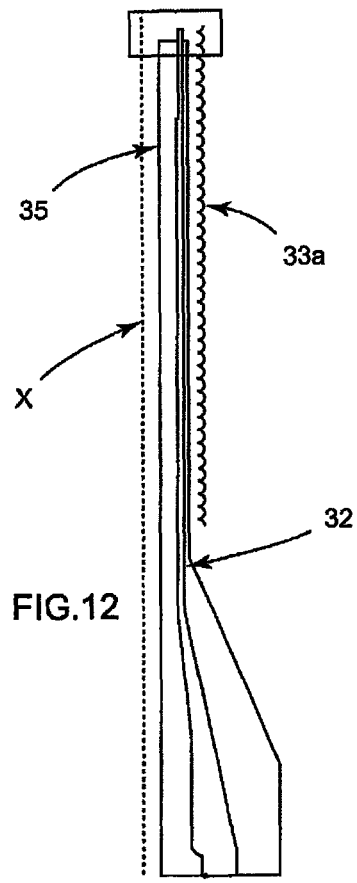
FIG. 12 is a partial schematic view in axial half-section of one of the two shells of an extrusion blow-moulding mould of this installation receiving the extrudate intended to form the corrugated portion.

A pipe 1 according to the invention is illustrated in FIG. 10, this pipe preferably being made by an extrusion blow-moulding of at least one thermoplastic material and comprising in this example a number of corrugated and bent or bendable portions 2, 3, 4, 5 which are interlinked by smooth and straight portions 6, 7, 8 and each of which can be seen precisely in FIGS. 1 to 9. This pipe 1 is of single-layer or multilayer type, being able to comprise in the latter case a radially internal layer based on a thermoplastic elastomer, such as a TPV, and a radially outer layer based on a plastomer, such as a polyamide, as a non-limiting example.

As can be seen in FIGS. 1, 5 and 6, each corrugated portion 2 to 5 of the pipe 1 defines a tubular structure 10 having a plurality of radial reliefs 11 which follow one another axially by being separated in pairs from one another by substantially flat hollows 12 and which are each discontinuous in the circumferential direction. More specifically, each relief 11 has two frontal regions, respectively front 13 and rear 14, which each have one and the same contour 15 in the form of a convex regular polygon with n flat sides 16, truncated at its summits by n rounded sections 17 (n being an integer equal to or greater than 3), these regions 13 and 14 being joined together by a circumferential intermediate region 18.

Figure 13:
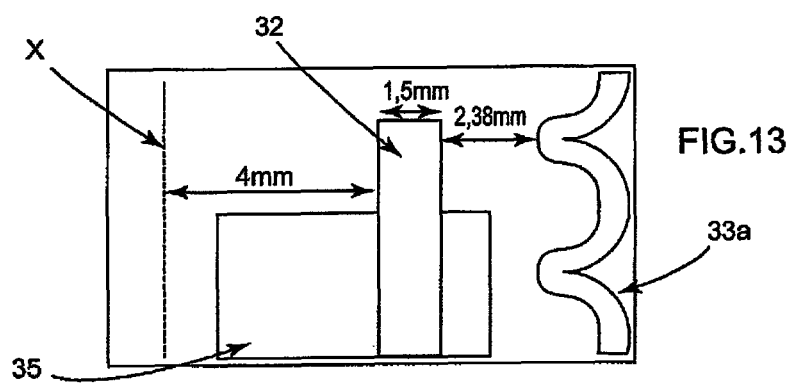
FIG. 13 is a detail view in axial half-section of the framed region that can be seen in FIG. 12 illustrating in particular the output of the extrudate from the die, inside this shell of the mould.

As illustrated in FIGS. 2 to 4, the respective contours 15 of the reliefs 11 are identical but angularly offset between the reliefs 11, two-by-two consecutively, by one and the same angle $\alpha$ of $\pi/n$ radians by thus defining, in alternation over the length of the portion 10, two unique angular positions for these polygons 15, which allows for the stripping of the pipe along a single joint plane between the two shells of the extrusion blow-moulding mould (see FIGS. 12 and 13). In this example of FIGS. 2 to 4, the contours 15 are squares (n=4) truncated by four slightly rounded and convex summits 17, that is an angle of offset between the contours 15 of $\pi/4$ radians (or 45°).

It can be seen in particular in FIGS. 1 and 4 that, in each relief 11, the rounded sections 17 form between them n discontinuous convex bulges 19 (see FIG. 5 for this convexity in the axial direction) with a section in the form of a circular arc (both in the axial and circumferential directions) which are linked together in pairs in the circumferential direction by flats 20 defined by the sides 16 of each polygon 15. These flats 20, also discontinuous over the circumference of each relief 11, thus form an axially central part of the bottom of each hollow 12, which is complemented on either side of these flats 20 by two continuous circumferential smooth portions 21 of small axial width (see FIG. 1).

As a non-limiting illustration, FIGS. 3 and 5 show the distance separating two opposite flat sides 16 of the square 15 (16.5 mm) and that separating two opposite bulges 19 (20 mm, or the diagonal of the truncated square 15). As for the thickness e of the smooth portions 21, it is, in the example of FIG. 1, approximately 1.75 mm.

The variant corrugated portions 10', 10'', 10''' according to FIGS. 7, 8 and 9 respectively illustrate reliefs which are in the form of:

regular pentagons with n=5 flats 20' linked together by as many bulges 19' (or α=π/5 radians), regular hexagons with n=6 flats 20'' linked together by as many bulges 19'' (or α=π/6 radians), and equilateral triangles with n=3 flats 20''' linked together by as many bulges 19''' (or α=π/3 radians).

To manufacture a pipe 1 incorporating such corrugated portions 10 to 10''' such as the portions 2 to 5 of FIG. 10, an extrusion blow-moulding installation 30 such as that of FIG. 11 is advantageously used, with, upstream, an extruding machine 31 intended to feed extrudate 32 in the direction A in a machine 33 capable of forming corrugations on a pipe ("corrugator") and formed by two chains of hemicylindrical shells 33a and 33b ("mould chains") which are mobile on endless conveyors in opposite directions of rotation and which form, one against the other, a cylindrical mould, to obtain each corrugated portion 10 to 10''' after cutting in a cutting unit 34 situated downstream of the machine 33.

FIGS. 12 and 13 schematically illustrate a possible geometry of the die 35 of the extruding machine 31 with an axis of rotation X, in relation to a shell 33a of the extrusion blow-moulding mould receiving the extrudate 32.

The Applicant has subjected multilayer pipes 1 (notably with an inner layer based on TPV ("Santoprene") and with an outer layer based on PA12) incorporating corrugated portions such as those of FIGS. 1 to 9 to tests in normal conditions of displacements and temperature and pressure of the cooling fluids conveyed, tests which have in particular demonstrated the improved resistance to axial elongation of the reliefs of these corrugated portions via dimensional stability tests (implemented after an ageing of 2 hours at 118° C. then 30 minutes at 135° C. at 1.4 bar of pressure, with a fluid consisting of a 50/50 mixture of glycol and water) compared to known corrugated pipes, and have also resulted in an improved resistance to the pressure of the fluid for these pipes 1 (bursting pressure at 118° C.: approximately 7.8 bar) compared to these known pipes.

The invention claimed is:

1. Fluid transfer pipe for filling a cooling circuit of a motor vehicle heat engine, comprising at least one single-layer or multilayer corrugated bendable portion which is based on at least one thermoplastic material and which comprises a succession of radial reliefs which are axially spaced so as to form hollows between them, each relief having two frontal regions linked together by an intermediate region, the frontal regions of each relief each having one and the same overall polygonal contour defining at least three straight sections which are interlinked by rounded sections and which each have a length greater than that of each rounded section, said at least one corrugated portion being molded from two hemicylindrical shells of a mold along a single axial stripping plane, wherein, at the level of said rounded sections of each relief, said two frontal regions meet in said intermediate region by forming, for each relief, n (n being an integer equal to or greater than 3) discontinuous convex bulges which are substantially in the form of a circular arc in the circumferential and axial directions in said intermediate region, wherein the respective contours of said reliefs are identical and angularly offset from one relief to another, the contour of each relief substantially defining a convex regular polygon with n sides and with n truncated summits respectively formed by said rounded sections, the reliefs following one another in alternation according to one and the same angular offset (α) of π/n radians by defining two angular positions for the polygons of all of these reliefs, and wherein, viewed in a longitudinal axial section of said at least one corrugated bendable portion, two said consecutive bulges are separated from one another in the axial direction by a substantially flat hollow defined by one of said at least three straight sections of an intermediate said relief located axially between said consecutive bulges.

2. The pipe according to claim 1, wherein the contours of said reliefs each have an even number n of sides, being truncated squares offset in alternation according to an angle (α) of π/4 radians or else truncated regular hexagons offset according to an angle (α) of π/6 radians.

3. The pipe according to claim 1, wherein said reliefs are separated two-by-two from one another by an interstitial peripheral smooth portion of said at least one corrugated portion, these reliefs not having any axial bridges linking them together two-by-two.

4. The pipe according to claim 1, wherein the pipe is molded by extrusion blow-molding of at least one plastomer and/or thermoplastic elastomer in a mold with two shells defining an axial stripping plane for the pipe.

5. The pipe according to claim 1, wherein said at least one corrugated portion comprises an internal layer made of a thermoplastic elastomer and an external layer made of a plastomer, all the layers of this corrugated portion having said reliefs and said hollows.

6. The pipe according to claim 1, wherein said at least one corrugated portion includes a smooth internal tubular portion and a corrugated external tubular portion which defines said reliefs and said hollows and which covers said internal portion by being attached thereto.

7. The pipe according to claim 1, wherein said reliefs are each centered on a transversal plane perpendicular to the longitudinal axis of symmetry of the pipe.

8. The pipe according to claim 1, wherein said reliefs are each centered on a plane forming with the longitudinal axis of symmetry of the pipe an angle of between π/6 and π/2 radians.

9. A method for manufacturing a pipe according to claim 1, comprising a molding by extrusion blow-molding of at least one plastomer and/or thermoplastic elastomer from an extruding machine to a mold with two mobile hemicylindrical shells, these shells defining an axial stripping plane for the pipe.

* * * * *